United States Patent [19]

Saito et al.

[11] 3,859,326

[45] Jan. 7, 1975

[54] PROCESS FOR SIMULTANEOUSLY PRODUCING METHACRYLONITRILE AND BUTADIENE BY VAPOR-PHASE CATALYTIC OXIDATION OF MIXED BUTENES

[75] Inventors: Shigeru Saito, Tokyo; Jun Ishikura; Yutaka Sasaki, both of Yokohama, all of Japan

[73] Assignee: Nitto Chemical Industry Co., Ltd., Tokyo, Japan

[22] Filed: July 19, 1972

[21] Appl. No.: 273,282

[52] U.S. Cl. ............................................. 260/465.3
[51] Int. Cl. ..................... C07c 121/02, C07c 11/12
[58] Field of Search ..................... 260/465.3, 680 E

[56] References Cited
UNITED STATES PATENTS
3,433,823  3/1969  McMahon...................... 260/465.3
3,625,867  12/1971  Yoshino et al................... 260/465.3

*Primary Examiner*—Joseph P. Brust

[57] ABSTRACT

This invention provides a process for simultaneously producing methacrylonitrile and butadiene which comprises contacting a mixture of mixed butenes containing isobutene and n-butenes, oxygen and ammonia as the substantial reactants with a catalyst containing as the active component a composition having the empirical formula $Fe_{10}\text{-}W_{1\text{-}30}X_{0.01\text{-}15}Me_{0.01\text{-}5}O_{12\text{-}143}$ wherein X is at least one element selected from the group consisting of P, B and Te, and Me represents V and/or Mo in vapor phase.

4 Claims, No Drawings

PROCESS FOR SIMULTANEOUSLY PRODUCING METHACRYLONITRILE AND BUTADIENE BY VAPOR-PHASE CATALYTIC OXIDATION OF MIXED BUTENES

BACKGROUND OF THE INVENTION

1. Field of the Invention

This invention relates to a process for simultaneously producing methacrylonitrile and butadiene by simultaneously effecting ammoxidation and oxidation of mixed butenes containing as the substantial reactant isobutene and n-butenes in vapor phase.

Description of the Prior Art

Heretofore, efficient simultaneous production of methacrylonitrile and butadiene from mixed butenes containing isobutene and n-butenes by simultaneously effecting ammoxidation and oxidation in vapor phase using one and the same catalyst under common reaction conditions has been considered to be difficult due to difference in reactivity between isobutene and n-butenes.

A number of processes have recently been proposed for the production of methacrylonitrile from olefins by vapor-phase ammoxidation as well as for the production of butadiene from olefins by vapor phase catalytic oxidation. However, all of these processes involve separative use of isobutene or n-butenes alone, and there has scarcely been proposed the process for simultaneously producing methacrylonitrile and butadiene by vapor-phase oxidation of mixed butenes. Isobutene and n-butene are separated and purified usually from the B—B fraction (fraction containing a mixture of butanes, butenes and butadiene, namely $C_4$ fraction) formed on cracking a petroleum fraction (for example, naphtha or kerosene, or crude oil) or the B—B fraction by-produced in purification of petroleum, and isobutene, 1-butene, cis-2-butene, trans-2-butene and butanes are quite similar in chemical and physical properties. Accordingly, separation and purification to isolate isobutene or n-butenes with a high purity are not easy and besides are expensive.

SUMMARY OF THE INVENTION

The major object of this invention is to provide a process for simultaneously and efficiently producing methacrylonitrile and butadiene by subjecting a mixture of mixed butenes containing isobutene and n-butenes, air or oxygen and ammonia as the substantial reactants to vapor phase oxidation.

The above-mentioned object is realized by the discovery made by the present inventors after investigations in various ways that catalysts consisting of an oxide composition containing iron, tungsten, and at least one element selected from the group consisting of phosphorus, boron and tellurium and an oxidation composition consisting of the former composition with oxides of vanadium and/or molybdenum added exert excellent activities to effect simultaneous production of methacrylonitrile and butadiene in high selectivity at high total conversion.

According to the process of this invention, reactions with a high total conversion of mixed butenes can be carried out at a relatively low temperature and, moreover, simultaneous production of methacrylonitrile and butadiene is feasible under the reaction condition as such at very high conversions. In addition, the methacrylonitrile can surprisingly be obtained in a higher yield than in the production of methacrylonitrile singly from isobutene. The yield of butadiene in this reaction is also no less than that in the vapor phase catalytic oxidation of n-butene alone.

Thus, the present invention provides advantageous execution of vapor phase oxidation reaction of mixed butenes containing isobutene and n-butenes by the use of a specific metal oxide catalyst.

Butanes, if any, are inactive in this reaction in the reaction zone according to the process of this invention. The presence of ammonia in the formation of butadiene produces no substantial effect upon the oxidative dehydrogenation of n-butene in the reaction zone according to the process of this invention.

In these respects, the aforementioned B—B fraction formed on cracking a petroleum fraction such as, for example, naphtha or kerosene or the B—B fraction by-produced in purification of petroleum as it is, or the spent B—B fraction from separation of butadiene from the former fraction can be used as the starting material in the present invention. Particularly, the use of the starting material containing 10 to 90 percent of isobutene and 90 to 10 percent of 1-butene and/or 2-butene is significantly effective in the process of the present invention.

Generally, what is called spent B—B is included within the above-mentioned range of composition and contains butanes besides said compositions. As mentioned above, however, butanes are inactive under the reaction conditions of the present invention, and the spent B—B is particularly suitable as the starting material of the present invention. As mentioned above, the above is accompanied by great advantages that the reaction with a high total conversion of the B—B fraction is conducted at a relatively low temperature and simultaneous production of methacrylonitrile and butadiene is feasible in a high selectivity. As separation and purification of the methacrylonitrile and butadiene obtained by the process of this invention are easily conducted by the use of difference in boiling point and/or solubility in solvent between the two, the process is commercially very advantageous.

DESCRIPTION OF THE INVENTION

According to the present invention, compositions of the empirical formula

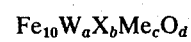

$$Fe_{10}W_aX_bMe_cO_d$$

wherein X is at least one element selected from the group consisting of P, B and Te, Me is V and/or Mo and the suffixes $a$, $b$, $c$ and $d$, respectively denoting the atomic ratio, are of values in the ranges: $1 \leq a \leq 30$, $0.01 \leq b \leq 15$, $0.01 \leq c \leq 5$ and d is a value corresponding to the oxides formed from the above-mentioned components by combination and is from 12 to 143 are used as the catalyst useful in effecting the simultaneous production of methacrylonitrile and butadiene by vapor-phase oxidation of mixed butenes.

The ratio of iron to tungsten in the catalyst of this invention is defined in terms of atomic ratio to be preferably from 10:1 to 10:30.

The phosphorus, boron or tellurium component is preferably added at a ratio from 0.01 to 15 against 10 of the iron component in terms of atomic ratio. As for the vanadium or molybdenum component, it is preferable to add at a ratio from 0.01 to 5 against 10 of the iron component.

This is critical for good activity as well as for good selectivity with respect to the aforementioned reaction and is determined on the basis of experiments.

The catalysts having the above-mentioned composition can be produced by any known method, provided that the components are intimately mixed and combined. Said empirical formula is based upon the analytical value, although exact chemical structure of material constituting the catalyst is unknown.

The starting material for providing the iron component of the catalyst can be selected from many members. For example, an oxide of iron in the form of ferrous oxide, ferric oxide or ferro-ferric oxides can be used. Also, those compounds which are finally stabilized as iron oxide after chemical treatment, calcining treatment or the like may be used. These compounds include salts of iron with an inorganic acid such as iron nitrate and iron chloride, salts of iron with an organic acid such as iron acetate and iron oxalate, etc. The salts can be converted into the oxide by neutralizing them with a basic substance such as aqueous ammonia to form iron hydroxide and then calcining said iron hydroxide or by directly calcining them. Besides, hydroxides of iron or metallic iron can be used. The metallic iron is preferably treated with heated nitric acid. In this case the iron is converted into ferric nitrate. Whatever starting material is selected, it is critical to intimately mix the material with other components.

Any one of water soluble or insoluble tungsten compounds can be used as the tungsten component source. For example, tungsten trioxide, tungstic acid, ammonium paratungstate, ammonium metatungstate, tungsten halides or the like may be used.

The starting material of the phosphorus or boron component may be of any nature but is most conveniently added in the form of phosphoric acid or boric acid.

Any one of water soluble or insoluble tellurium compounds can be used as the tellurium component. For example, tellurium dioxide, tellurous acid, telluric acid may be used.

Any one of water soluble or insoluble vanadium compounds can be used as the vanadium component source. For example, vanadium pentoxide, ammonium metavanadate, vanadyl oxalate, vanadium halides or the like may be used.

Any one of water soluble or insoluble molybdenum compounds can be used as the molybdenum component source. For example, molybdenum trioxide, molybdic acid, ammonium molybdate, molybdenum halides or the like may be used.

It is preferable to produce the catalyst composition by intimately mixing the vanadium or molybdenum component and the tellurium component together with the iron and tungsten components from the beginning.

Alternatively, the catalyst may be produced by initially preparing an iron-tungsten base catalyst followed by adding thereof with other components.

The phosphorus or boron component may either be coexisting in the aqueous solution of the above-mentioned components or may be separately added.

Activity of this catalyst system is increased by heating the same at a high temperature. The catalyst material composition which has been prepared to provide the desired composition and intimately mixed is dried and then heated at a temperature preferably from about 400° to about 950°C. for 2 to 48 hours and if required, may be calcined in several steps.

The catalyst can show excellent activity even without any carrier, but it may be combined with any suitable carrier. The entire catalyst may be formulated so that it contains 10 to 90 per cent by weight of the catalytic composition. As the carrier may be used silica, alumina, zirconia, silica alumina, silicon carbide, alundum, inorganic silicate, etc.

Any other additives such as a binding agent, which serve for improving the physical properties of the catalyst, may be optionally added unless they impair the activity of the catalyst.

The additives such as a carrier, a binding agent, an extender, etc. can be optionally added irrespective of their compositions provided that they do not remarkably change the characteristics of the catalyst of the present invention as described in the above or in the examples below. The catalyst containing these additives should be also regarded as the catalyst of the present invention.

The catalyst may be used in a fixed-bed reactor in the form of pellet or may be used in a fluidized-bed reactor in the form of fine particle.

The reaction conditions for the use of the catalyst of the present invention will be explained below.

Any oxygen source may be employed but, for economy, air is conveniently used. On the other hand, space-time yield in the process of this invention can be increased by replacing all or a part of the air by oxygen to increase the concentration of mixed butenes in the reaction gas while maintaining the mixed butenes-oxygen molar ratio in a predetermined range. Under such reaction conditions, yields of the desired products are considerably lowered with the prior-art catalysts, whereas use of the catalyst of this invention is encountered with almost no reduction of the yields. The enrichment of air with oxygen as set forth above is a favorable means for increasing efficiency in the purification system and prolonging the life of the catalyst. The process involving the oxygen enrichment is preferably conducted in a fluidized bed-reactor. The molar ratio of oxygen to mixed butenes in the starting reaction gas is preferably in the range between 0.5 and 6.

The formation of methacrylonitrile requires at least 1 mole of ammonia per mole of isobutene. Lower ratios of ammonia will be unfavorable due to higher by-production of methacrolein. The amount of ammonia used is preferably at a molar ratio from 1 to 6 on the basis of isobutene in the mixed butenes. Composition of the starting gas is variable depending upon the composition of mixed butenes and it is preferred to lower the ratio of oxygen and ammonia with higher content of 1-butene and to raise the ratio of oxygen and ammonia with higher content of isobutene.

Addition of steam to the reaction gas, which is often used in the gas phase catalytic oxidation reaction, may also be introduced in the process of this invention, if required. Use of water in an amount below 5 moles per mole of the mixed butenes may be sufficient in such a case.

The oxygen supplied to the reactor may be supplied in divided streams, some of the oxygen being supplied to the reactor inlet, the remainder being supplied into one or more suitable sites in the reactor. This method, which often produces good results, is described in U.S. Pat. No. 3,346,617.

Low partial pressure of oxygen will facilitate byproduction of methacrolein even if partial pressure of ammonia is sufficiently high. In such a case divided supply of oxygen is significantly effective for lowering the production of methacrolein.

The presence of ammonia produces no substantial effect upon the oxidative dehydrogenation of n-butenes. In some cases, on the contrary, co-existence of ammonia appears to increase the butadiene selectivity.

The temperature at which the reaction is carried out is suitably in the range between about 350° and 500°C. and the reaction when conducted at a temperature from about 380° to 480°C. produces especially good results. From the operational point of view it is preferable to carry out the reaction at and around atmospheric pressure but, if required, reduced or elevated pressure may be applied.

Space velocity, which is an important reaction condition in the vapor phase catalytic reaction using a solid catalyst, is suitably from about 5,000 to 100 hr.$^{-1}$ in the process of this invention. The reaction when conducted at a space velocity from about 2,000 to 200 hr.$^{-1}$ produces especially good results. The space velocity referred to herein is the value of gas volume in terms of NTP passing per hour per unit volume of the catalyst.

Recovery of the desired products methacrylonitrile and butadiene from the reaction product may be made by washing the outlet gas from the reactor with cold water or a solvent suitable for extracting methacrylonitrile and butadiene. Also, any method for recovery which is conventional in the reaction of such a nature may be used.

In carrying out the process of this invention any one of the fixed bed-catalyst, moving bed catalyst and fluidized bed-catalyst equipments conventionally used for the gas phase catalytic reaction may be employed.

The catalysts of this invention generally have little ammonia combustibility but some of them with a certain composition have the combustibilities; in the latter case, addition of steam to the reaction system may be effective for the inhibition of ammonia combustion.

During the process of this invention 2-butene probably undergoes isomerization, which then produces butadiene. As compared with 1-butene, 2-butene is low in reaction rate and slightly inferior in selectivity.

DESCRIPTION OF PREFERRED EMBODIMENTS

Embodiments of the construction and results of the present invention are shown by the following Examples and Reference Examples:

PREPARATION OF THE CATALYST

Catalyst 1

A catalyst with the empirical formula $Fe_{10}W_2Te_4Mo_{0.5}Si_{30}O_{91}$ was prepared as follows:

In a solution composed of 120 ml. of nitric acid (specific gravity 1.38) and 150 ml. of water were dissolved 11.2 g. of electrolytic iron powders to a solution.

To the iron nitrate solution prepared above were dissolved 10.2 g. of metallic tellurium powders to a solution. (I)

In 550 ml. of water were dissolved 10.4 g. of ammonium tungstate and 1.8 g. of ammonium molybdate. (II)

As the carrier component were employed 180 g. of silica sol ($SiO_2$ 20% by weight). (III)

To a mixture of (I) and (III) was added (II).

The resulting mixture was heated under stirring to dryness. The dried matter, pulverized, was calcined at 200°C. for 2 hours and subsequently at 400°C. for 2 hours, followed by addition of water and blending. The blended matter was formed into pellets, which was dried at 130°C. for 16 hours and then calcined at 700°C. for 4 hours.

Catalyst 2

A catalyst with the empirical formula $Fe_{10}W_{10}Te_5Mo_1Si_{50}O_{158}$ was prepared in accordance with the method for Catalyst 1.

Catalyst 3

A catalyst with the empirical formula $Fe_{10}W_{25}Te_{10}Mo_2Si_{100}O_{316}$ was prepared in accordance with the method for Catalyst 1 except that conditions for final calcining were at 600°C. for 4 hours.

Catalyst 4

A catalyst with the empirical formula $Fe_{10}W_{10}Te_2P_2Mo_1Si_{50}O_{157}$ was prepared in accordance with the method for Catalyst 1 except that conditions for final calcining were at 650°C. for 4 hours.

Catalyst 5

A catalyst with the empirical formula $Fe_{10}W_{25}Te_{10}V_1Si_{50}O_{213}$ was prepared in accordance with the method for Catalyst 1 except that conditions for final calcining were at 600°C. for 4 hours.

Catalyst 6

A catalyst with the empirical formula $Fe_{10}W_{20}P_2Mo_1Si_{30}O_{143}$ was prepared in accordance with the method for Catalyst 1 except that P component was added instead of Te component and phosphoric acid was used as the starting material for P component.

The conditions for final calcining of the catalyst were at 600°C. for 4 hours.

Catalyst 7

A catalyst with the empirical formula $Fe_{10}W_{20}B_2Mo_1Si_{30}O_{141}$ was prepared in accordance with the method for Catalyst 1 except that B component was added instead of Te component and boric acid was used as the starting material for B component.

The conditions for final calcining of the catalyst were at 600°C. for 4 hours.

METHODS AND RESULTS OF THE TEST

The method of testing the catalyst was as follows:
1. Composition of the mixed butenes starting materials.
   A. Isobutene 52%, 1-butene 48%.
   B. Butane 12%, isobutene 46%, 1-butene 28%, 2-butene 14%.

The starting materials used are cited in the table 1 and table 2 as A, B.

2. Reaction procedures.

2-1. Reaction in a fixed bed

Reactions were performed in a fixed bed using Catalysts 1–7.

A U-shaped reactor, 16 mm.$\phi$ in inner diameter and 500 mm. in length, was filled with 20 ml. of the catalyst which formed into pellets 2 mm.$\phi \times$ 2 mm.$\phi$. The reactor was heated in a salt bath of an equal-amount mixture of sodium nitrite and potassium nitrate to maintain the same at a predetermined reaction temperature. The reactant gas was passed through the reactor thus prepared at a rate of 10 liters per hour (in term of NTP). The reaction pressure was atmospheric.

Composition of the supplied gas was as follows:

air/mixed butenes = 16 (molar ratio)
NH$_3$/mixed butenes = 0.8 (molar ratio)
The bath temperature was successively changed and reaction was continued for 30 min. to 1 hour at a given temperature.

The reaction gas was analyzed by gas chromatography. Data of the reactions that have given the best results are shown in Table 1.

In the Reference Examples, reactions were performed with 1-butene or isobutene alone under the same conditions as the Examples, the results of which are also shown in Table 1.

2-2. Reaction in a fluidized-bed

Catalysts 3 and 5 were subjected to a spray drying in accordance with the conventional method and subsequently to the same calcining treatment as mentioned above to produce a fluidized catalyst, and then reactions were performed in a fluidized bed using the fluidized catalyst.

The reaction apparatus used was 2 in. in inner diameter and 1 m. in height. It was filled with the catalyst 10–100μ in particle size for the most part in such a manner that space velocity was 500 hr.$^{-1}$ The supplied gas prepared so as to give the below-mentioned composition was passed through the reactor at a linear velocity of 15 cm./sec.
air/mixed butenes = 16 (molar ratio)
ammonia/mixed butenes = 0.8 (molar ratio)
Analysis of the reaction gas was made by gas chromatography.

Results of the reactions are shown in Table 2.

The total conversion respectively of isobutene and n-butenes (1-butene and 2-butene) in the mixed butenes and conversion respectively to methacrylonitrile and butadiene as referred to herein are defined as follows:

A
Total conversion (percent) of isobutene
$$= \frac{\text{Weight of the carbon in isobutene reacted}}{\text{Weight of the carbon in isobutene supplied}} \times 100$$

B
Total conversion (percent) of n-butenes
$$= \frac{\text{Weight of the carbon in n-butenes reacted}}{\text{Weight of the carbon in n-butenes supplied}} \times 100$$

A'
Conversion (percent) to methacrylonitrile
$$= \frac{\text{Weight of the carbon in methacrylonitrile formed}}{\text{Weight of the carbon in isobutene supplied}} \times 100$$

B'
Conversion (percent) to butadiene
$$= \frac{\text{Weight of the carbon in butadiene formed}}{\text{Weight of the carbon in n-butenes supplied}} \times 100$$

Selectivity (percent) of methacrylonitrile $= \frac{A'}{A} \times 100$

Selectivity (percent) of butadiene $= \frac{B'}{B} \times 100$

TABLE 1

| Example | Catalyst | Composition of the catalyst (atomic ratio) | | | | | Conditions for the final calcining of the catalyst | | Mixed butenes starting material |
|---|---|---|---|---|---|---|---|---|---|
| | | Fe | W | X | Me | Si | Temp. (°C) | Hour (hrs) | |
| 1 | 1 | 10 | 2 | Te 4 | Mo 0.5 | 30 | 700 | 4 | A |
| 2 | 2 | 10 | 10 | Te 5 | Mo 1 | 50 | 700 | 4 | A |
| 3 | 3 | 10 | 25 | Te 10 | Mo 2 | 100 | 600 | 4 | A |
| 4 | 3 | 10 | 25 | Te 10 | Mo 2 | 100 | 600 | 4 | B |
| 5 | 4 | 10 | 10 | Te 2 P 2 | Mo 50 | 650 | 4 | A | |
| 6 | 5 | 10 | 25 | Te 10 | V 1 | 50 | 600 | 4 | B |
| 7 | 6 | 10 | 20 | P 2 | Mo 1 | 30 | 600 | 4 | A |
| 8 | 7 | 10 | 20 | B 2 | Mo 1 | 30 | 600 | 4 | A |
| Reference Example | | | | | | | | | |
| 1 | 2 | 10 | 10 | Te 5 | Mo 1 | 50 | 700 | 4 | — |
| 2 | 5 | 10 | 25 | Te 10 | V 1 | 50 | 600 | 4 | — |
| 3 | 7 | 10 | 20 | B 2 | Mo 1 | 30 | 600 | 4 | — |
| 4 | 2 | 10 | 10 | Te 5 | Mo 1 | 50 | 700 | 4 | — |

Table 1

| Example | Optimum reaction temperature (°C) | Total Conversion (%) of | | Conversion (%) to | | Selectivity (%) | |
|---|---|---|---|---|---|---|---|
| | | Isobutene | 1-butene, 2-butene | Methacrylonitrile | Butadiene | Methacrylonitrile | Butadiene |
| 1 | 400 | 98 | 95 | 71 | 75 | 72 | 79 |
| 2 | 410 | 98 | 94 | 79 | 81 | 81 | 86 |
| 3 | 410 | 97 | 92 | 83 | 82 | 85 | 89 |
| 4 | 410 | 93 | 88 | 79 | 76 | 85 | 86 |
| 5 | 410 | 98 | 92 | 72 | 74 | 73 | 80 |
| 6 | 400 | 96 | 92 | 69 | 72 | 72 | 78 |
| 7 | 400 | 95 | 92 | 68 | 71 | 72 | 78 |
| 8 | 400 | 96 | 93 | 68 | 72 | 71 | 76 |

Table 1—Continued

| Example | Optimum reaction temperature (°C) | Total Conversion (%) of Iso-butene | Total Conversion (%) of 1-butene, 2-butene | Conversion (%) to Methacrylonitrile | Conversion (%) to Butadiene | Selectivity (%) Methacrylonitrile | Selectivity (%) Butadiene |
|---|---|---|---|---|---|---|---|
| Reference Example | | | | | | | |
| 1 | 410 | 99 | — | 77 | — | 78 | — |
| 2 | 400 | 98 | — | 67 | — | 68 | — |
| 3 | 400 | 98 | — | 64 | — | 65 | — |
| 4 | 410 | — | 97 | — | 81 | — | 83 |

Table 2

| Example | Catalyst | Fe | W | X | Me | Si | Conditions for the final calcining of the catalyst Temp. (°C) | Conditions for the final calcining of the catalyst Hour (hrs) | Mixed butenes starting material |
|---|---|---|---|---|---|---|---|---|---|
| 9 | | 3 | 10 | 25 | Te 10 Mo 2 | 100 | 600 | 4 | A |
| 10 | | 5 | 10 | 10 | Te 2 P 2 Mo 1 | 50 | 600 | 4 | A |

Table 2

| Example | Optimum reaction temperature (°C) | Total conversion (%) of Iso-butene | Total conversion (%) of 1-butene, 2-butene | Conversion (%) to Methacrylonitrile | Conversion (%) to Butadiene | Selectivity (%) Methacrylonitrile | Selectivity (%) Butadiene |
|---|---|---|---|---|---|---|---|
| 9 | 420 | 95 | 90 | 80 | 79 | 84 | 88 |
| 10 | 400 | 95 | 92 | 70 | 71 | 74 | 77 |

We claim:

1. Process for simultaneously producing methacrylonitrile and butadiene which comprises contacting a mixture of butenes consisting essentially of isobutene and n-butene, oxygen and ammonia in vapor phase at a temperature of from about 350° to 500°C with a catalyst consisting of an oxide composition containing the elements in atomic ratio according to the formula $$Fe_{10}W_aX_bMe_cO_d$$

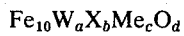

wherein X is at least one element selected from the group consisting of phosphorus, boron and tellurium; Me is at least one element selected from the group consisting of vanadium and molybdenum; the subscripts denote atomic ratio and have the values:

a = 1–30
b = 0.01–15
c = 0.01–5;

and d is a value corresponding to the oxides formed from the above components by combination and is from 12 to 143, wherein said catalyst is produced by intimately mixing at least one compound of each of the respective elements in an aqueous system, heating to dryness and calcining at a temperature from about 400° to about 950°C for 2 to 48 hours.

2. The process of claim 1, wherein said mixtures of butenes consists essentially of from about 10 to about 90 percent isobutene and about 10 to about 90 percent 1-butene and/or 2-butene; the oxygen/mixed butene molar ratio is from 0.5/1 to 6/1; and the ammonia/isobutene molar ratio is from 1/1 to 6/1.

3. Process according to claim 1 wherein space velocity of said starting mixture is within the range from 5,000 to 100 hr.$^{-1}$ 4. Process according to claim 1 wherein said catalyst is in combination with silica carrier in a portion from 10 to 90 percent by weight.

* * * * *